United States Patent [19]

Roettele et al.

[11] 4,318,103

[45] Mar. 2, 1982

[54] COMPACT RADAR DETECTOR AND RANGE EXTENDER

[75] Inventors: Donald L. Roettele; William E. Yohpe, both of Dayton, Ohio

[73] Assignee: ComGeneral Corporation, Dayton, Ohio

[21] Appl. No.: 130,722

[22] Filed: Mar. 17, 1980

[51] Int. Cl.[3] ........................ H01Q 19/06; G01S 7/36

[52] U.S. Cl. .................................. 343/18 E; 343/753; 343/783

[58] Field of Search ...................... 343/18 E, 753, 783

[56] References Cited

U.S. PATENT DOCUMENTS 2,283,568 5/1942 Ohl ................................ 343/753 X
2,719,230 9/1955 Smoll et al. ......................... 343/783
2,822,541 2/1958 Sichak et al. ....................... 343/783
3,094,663 6/1963 Siegel ........................... 343/18 E X
3,833,906 9/1974 Augustine ....................... 343/753 X

*Primary Examiner*—T. H. Tubbesing
*Attorney, Agent, or Firm*—Jacox & Meckstroth

[57] ABSTRACT

A radar detector adapted to be carried by a motor vehicle, includes a housing enclosing a compact horn antenna having a tapering wall portion which defines a cavity extending from an aligned aperture within the housing. A plano-convex dielectric lens extends across the aperture and cavity and introduces a microwave phase delay decreasing from the center of the cavity towards the tapered wall portion of the horn antenna to compensate for the deficiencies in the compromised design of the antenna and for significantly increasing the sensitivity and gain of the detector. The dielectric lens may project outwardly from the housing or inwardly into the antenna cavity and may be molded as an integral part of the front wall of the detector housing. In one embodiment, the lens is also adapted to be conveniently attached to an existing radar detector.

3 Claims, 6 Drawing Figures

COMPACT RADAR DETECTOR AND RANGE EXTENDER

BACKGROUND OF THE INVENTION

In the construction of a radar detector of the type which is adapted to be carried on the dashboard of a motor vehicle for detecting radar signals being transmitted from a police radar traffic control unit, it is common for most manufacturers to use a horn type antenna. A typical horn antenna includes a tapering wall portion in the form of a frusto-pyramid. The wall portion defines a converging cavity which extends to a rectangular waveguide cavity in which a pair of diodes are mounted for detecting and modulating a microwave signal.

In such radar detectors, it is desirable to minimize the size of the housing which has an aperture aligned with the horn cavity to minimize the depth of the detector. Thus the length of the horn antenna is substantially reduced from the optimum design for the horn antenna with the result that a sacrifice is made in the sensitivity or gain of the antenna, and weak signals are not detected. For example, the radar detectors marketed under the names "FUZZBUSTER", "WHISTLER", "BEARFINDER" and "RADAR RANGER" each include a horn antenna which has been substantially shortened from an optimum design in order to fit within a relatively compact housing which may be mounted on the dashboard of a motor vehicle.

The lost gain or sensitivity in the relatively short horn antenna is due to phase errors at the entrance or mouth of the antenna and in the use of improper angles for the tapering walls of the antenna in addition to matching errors at the junction of the tapered cavity with the these rectangular wave-guide cavity of the antenna. These errors result in higher sidelobe levels and/or less energy available for detection by the detector diode.

SUMMARY OF THE INVENTION

The present invention is directed to an improved compact radar detector of the type described above and which significantly increases the gain of the shortened horn antenna, thereby significantly increasing the sensitivity of the radar detector so that it will detect radar signals of lower levels. This primary advantage or feature of the invention is provided by incorporating a dielectric lens which is mounted on the detector housing adjacent the mount of the horn antenna cavity and which introduces a phase relationship across the mount of the cavity. The lens is constructed in order to make the phase of the microwave front at the horn antenna walls lag the phase of the wave front at the center of the horn cavity. Thus the lens introduces a phase delay which is maximum at the center of the cavity and decreases towards the tapered walls of the horn antenna, thereby producing a more planar wave in the horn cavity. As a result, a radar detector and lens assembly in accordance with the invention substantially increases the efficiency or performance of a compact radar detector unit by correcting the deficiencies in the comprised design of the horn antenna.

In accordance with one embodiment of the invention, the dielectric lens is adapted to be quickly and conveniently mounted on a radar detector housing with the aid of pressure sensitive adhesive. In accordance with another embodiment of the invention, the lens includes a flange portion which is sandwiched between the horn antenna and the housing and serves also to cover the cavity within the housing. The lens of the invention includes a portion having a convex or generally part-spherical surface and may project either inwardly into the horn antenna cavity or outwardly from the aligned aperture within the housing.

Other features and advantages of the invention will be apparent from the following description, the accompanying drawing and the appended claims.

DESCRIPTION OF THE PREFERRED EMBODIMENTS

Figure 1:
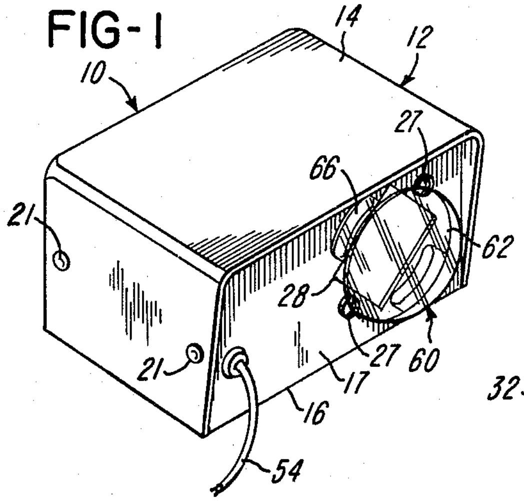
FIG. 1 is a perspective view of a radar detector incorporating a lens member constructed and assembled in accordance with the invention.

FIG. 1 illustrates a radar detector 10 which has been marketed by Electrolert Corporation in Troy, Ohio and which is referred to as the "Fuzzbuster". The detector 10 includes a sheet metal housing 12 formed by an inverted U-shaped top section 14 which covers a U-shaped bottom section 16 having a front wall 17 integrally connected to a rear wall 18 by a bottom wall 19. The top and bottom sections are secured together by a set of rivets 21 which extend through holes formed within flanges 22 on the front and rear walls of the bottom section 16.

Figure 2:
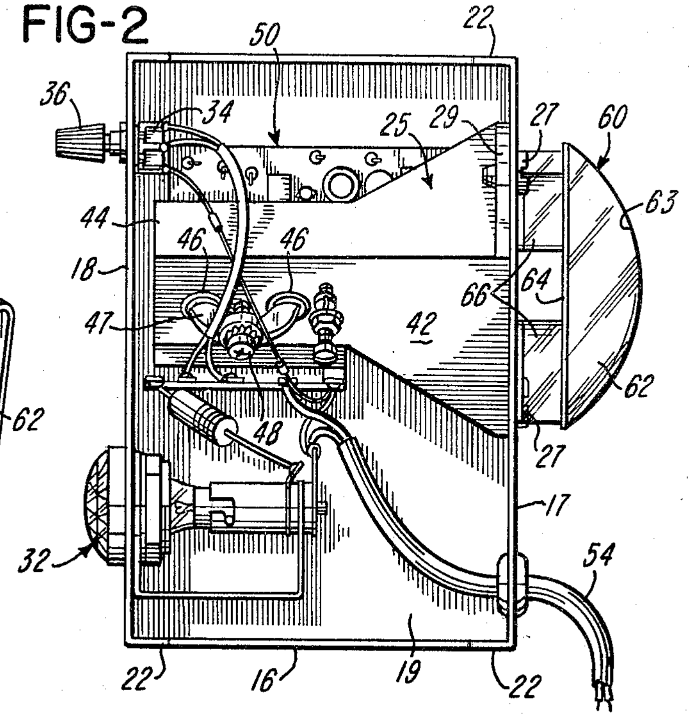
FIG. 2 is a plan view of the radar detector and lens assembly shown in FIG. 1 and with the top cover removed.

A horn antenna 25 in the form of a hollow aluminum casting, is cantileverly supported by the front wall 17 and is secured to the front wall 17 by a set of screws 27. The screws 27 extend through holes located on opposite sides of a square aperture 28 (FIG. 1) in the front wall 17 and are threaded into corresponding flanges or ears 29 (FIG. 2) cast as integral parts of the horn antenna 25. The rear wall 18 of the housing 12 supports an alarm in the form of a light indicating unit 32 and also supports a sensitivity selection unit 34 having an adjustable control knob 36.

The horn antenna 25 includes a tapering wall portion 42 in the form of a frusto-pyramid section which extends from a rectangular waveguide portion 44. Thus the portion 42 defines a converging cavity which extends from a rectangular waveguide cavity formed by the portion 44. A pair of diodes 46 extend into the waveguide cavity and are secured to the antenna portion 44 by the wings of an inverted thumb nut 47 secured to the antenna portion 44 by a screw 48. The diodes 46 are electrically connected through the nut 47 to a circuit board 50 which is supported by the base of the horn antenna 25 and carries the electrical components required for actuating the alarm 32 in response to the diodes 46 detecting a radar signal received through the aperture 28 and the cavity of the horn antenna 25. A power supply cord 54 supplies 12 volt DC power to the circuit board 50 for operating the components and the alarm 32, and usually, the power supply cord 54 carries a plug (not shown) which is adapted to be inserted into the cigarette lighter socket on the dashboard of an automobile or other motor vehicle.

As mentioned above, the length of the horn antenna 125 is selected in order to limit the spacing between the front wall 17 and the rear wall 18 of the housing 12 and thereby provide for a more compact radar detector 10. That is, if the horn antenna 25 was designed for optimum performance and maximum sensitivity to weak radar signals, the antenna would have a length substantially greater than the length of the antenna illustrated, and a substantially larger housing would be required to enclose the antenna. As a result of the compromise design for the horn antenna 25, the gain of the antenna is significantly reduced due to phase errors at the entrance of the antenna cavity and the incorrect angles of the tapering walls forming the forward end portion 2 of the antenna.

Figure 3:
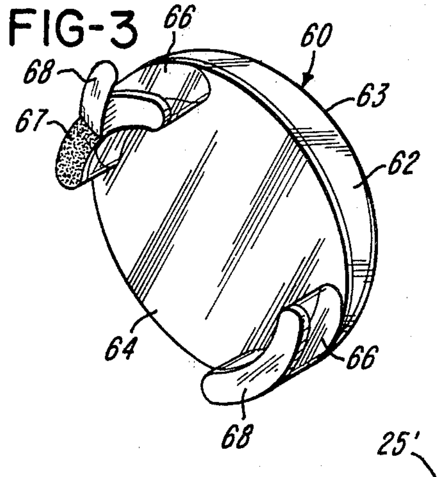
FIG. 3 is a perspective view of the radar detector lens shown in FIGS. 1 and 2 and illustrating its attachment to the radar detector housing.

In accordance with the present invention, a dielectric lens 60 is mounted on the radar detector housing 12 and is effective to correct the deficiencies of the horn antenna 125. The lens 60 shown in FIGS. 1–3 includes a plano-convex lens portion 62 having a substantially part-spherical outer surface 63 and a flat inner surface 64. The lens 60 is molded of an acrylic plastics material and includes a pair of integrally molded arcuate support legs 66 (FIG. 3) which extend from the surface 64 and are arranged in diametrically opposed relation. As shown in FIG. 3, each of the legs 66 carries a pad of pressure sensitive adhesive 67 which is normally protected by a release strip 68. The strips 68 are removed when it is desired to mount the lens 60 on the front wall 17 of the radar detector housing 12. The spacing between the legs 66 is sufficient for the legs to straddle the aperture 28 within the front wall 17, and the adhesive pads 67 rigidly secure the lens 60 to the housing 12 with the plano-convex portion 62 covering the aperture 28.

The configuration of the lens 60 is effective to make the face of the microwave front adjacent the walls of the antenna portion 42 lag the phase of the microwave at the center of the aperture 28 or the mouth of the horn antenna cavity. This causes a curve to be formed in the electromagnetic field across the aperture 28 with the phase delay at a maximum at the center of the aperture 28 and progressively decreasing towards the edges of the aperture or towards the tapering walls of the antenna portion 42. Thus the antenna 25 receives a more planar wave, which increases the gain of the antenna and the sensitivity of the detector 10 to lower levels of microwave signals.

The increase in gain and sensitivity provided by the plano-convex lens portion 62 is effective for a very wide frequency band including the "K-Band" and the "X-Band" and with either pulse or continuous signals and all polarized speed radar signals. The plano-convex lens also has minimal reflected wave interference characteristics and reduces the reception of false alarms. Thus the assembly of the lens in accordance with the invention significantly improves the operating range of the radar detector by focusing and concentrating weak radar signals so that the detector is activated at a further distance from the transmitter of the signals. In other words, the invention provides for a better match between the cavity of the horn antenna 25 and the detector diodes 46.

Figure 4:
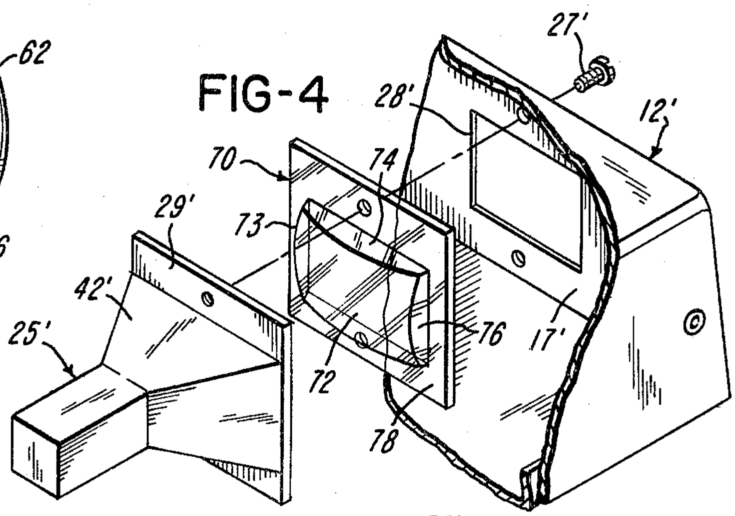
FIG. 4 is an exploded fragmentary perspective view illustrating the assembly of a horn antenna and lens constructed in accordance with a modification of the invention.
Figure 5:
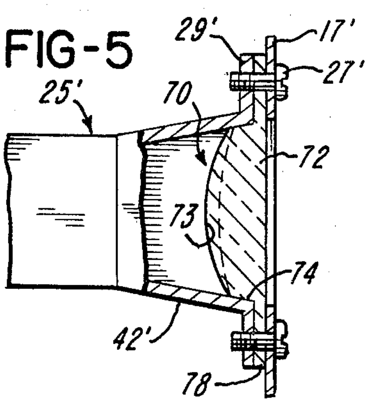
FIG. 5 is a fragmentary plan view, in part section, of the assembled components shown in FIG. 4.

Referring to FIGS. 4 and 5, it is also within the scope of the invention to construct or mold a plano-convex dielectric microwave lens 70 of an acrylic plastics material and to assemble the lens as a part of the radar detector when the detector is assembled. The lens 70 includes a rectangular portion 72 which projects into the tapered wall portion 42' of a horn antenna 25' constructed substantially the same as the horn antenna 25 mentioned above. The rectangular portion 72 of the lens 70 has an inner convex or substantially part-spherical surface 73 which is interruped by tapered side walls 74 and end walls 76 corresponding to the tapered walls of the portion 42' of the horn antenna 25'.

The lens 70 also includes a peripherally extending flange portion 78 which is positioned or sandwiched between the flange portion 29' of the antenna 25' and the front wall 17' of the detector housing 12'. A rectangular aperture 28' is formed within the front wall 17' and corresponds in size to the mouth of the cavity within the horn antenna portion 42', as shown in FIG. 5. A set of screws 27' secure the antenna 25' to the front wall 17' and clamp the flange portion 78 of the lens 70 therebetween. While the lens 70 functions in the same manner as the lens 60 described above, the modification shown in FIGS. 4 and 5, provides a particular advantage in that the lens 70 does not increase the size of the radar detector assembly, which is particularly desirable when space is limited, for example, on the dashboards of some automobiles. In addition, the lens 70 also functions as an insulator cover for the cavity within the horn antenna 25'.

Figure 6:
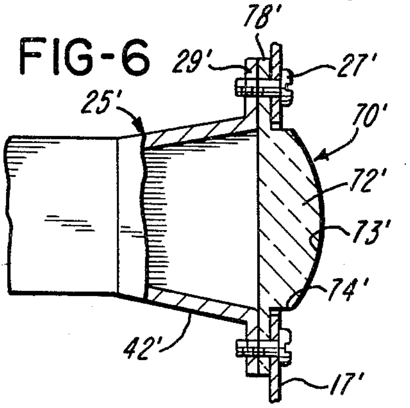
FIG. 6 is a fragmentary view similar to FIG. 5 and illustrating the assembly of a horn antenna and lens member in accordance with another modification of the invention.

In reference to FIG. 6, a plano-convex microwave lens 70' is constructed similarly to the lens 70, but with the rectangular portion 72' projecting outwardly from the horn antenna 25' through the aperture 28' instead of into the horn antenna cavity as shown in FIG. 5. In this modification, the opposite side surfaces 74' are parallel but are interrupted by the convex or substantially part-spherical surface 73'. In all other respects, the lens 70' functions in the same manner as the plano-convex lenses 60 and 70. It is also within the scope of the invention to mold the microwave lens as an integral part of a plastic front wall of a radar detector and thereby reduce the cost of manufacturing a radar detector in accordance with the invention.

While the forms of radar detectors herein described constitute preferred embodiments of the invention, it is to be understood that the invention is not limited to these precise forms of detectors, and that changes may be made therein without departing from the scope and spirit of the invention as defined in the appended claims.

The invention having thus been described, the following is claimed:

1. In a compact radar detector unit for detecting radar signals, said detector unit including a housing, a compact horn antenna disposed within said housing and having converging walls defining a tapered cavity, said housing having a front wall defining an aperture aligned with said cavity, said antenna including means for detecting radar signals received within said cavity, an alarm disposed within said housing, and circuit means for actuating said alarm in response to a predetermined signal received by said detecting means, the improvement comprising a dielectric lens member covering said aperture and said cavity, said lens member having a plurality of legs spaced to engage said front wall of said housing outwardly of said aperture, pressure sensitive adhesive for attaching said legs to said front wall of said housing, and said lens member having a surface effective to introduce a microwave phase delay decreasing generally from the center of said cavity towards said converging walls of said horn antenna to compensate for the compactness of said horn antenna and for significantly incresing the sensitivity of said detector.

2. A radar detector unit as defined in claim 1 wherein said legs are formed as an integral molded part of said lens member.

3. A radar detector unit as defined in claim 1 wherein said lens member comprises a plano-convex lens with a generally planar inner surface facing said cavity and a generally convex outer surface, and said legs project inwardly from said planar inner surface.

* * * * *